US012336062B2

(12) United States Patent
Bienvenu

(10) Patent No.: US 12,336,062 B2
(45) Date of Patent: Jun. 17, 2025

(54) DEFORMABLE AND FORMABLE HEATING MAT

(71) Applicant: SAFRAN AIRCRAFT ENGINES, Paris (FR)

(72) Inventor: Steven Gerard Joseph Bienvenu, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 878 days.

(21) Appl. No.: 17/441,871

(22) PCT Filed: Mar. 16, 2020

(86) PCT No.: PCT/FR2020/050569

§ 371 (c)(1),
(2) Date: Sep. 22, 2021

(87) PCT Pub. No.: WO2020/193915

PCT Pub. Date: Oct. 1, 2020

(65) Prior Publication Data

US 2022/0201805 A1 Jun. 23, 2022

(30) Foreign Application Priority Data

Mar. 28, 2019 (FR) ...................................... 1903212

(51) Int. Cl.
*H05B 3/34* (2006.01)

(52) U.S. Cl.
CPC ......... *H05B 3/34* (2013.01); *H05B 2203/004* (2013.01); *H05B 2203/014* (2013.01); *H05B 2203/017* (2013.01)

(58) Field of Classification Search
CPC ................ H05B 3/34; H05B 2203/004; H05B 2203/014; H05B 2203/017; H05B 2203/002
See application file for complete search history.

(56) References Cited

U.S. PATENT DOCUMENTS

| | | | | |
|---|---|---|---|---|
| 5,002,335 A * | 3/1991 | Bengtsson | A47C 7/72 | 297/180 |
| 2011/0114619 A1* | 5/2011 | Amils et al. | B60N 2/56 | 219/202 |

FOREIGN PATENT DOCUMENTS

| | | | |
|---|---|---|---|
| CN | 102912521 A1 * | 2/2013 | H05B 3/347 |
| DE | 3423999 A1 * | 7/1985 | H05B 3/36 |

(Continued)

OTHER PUBLICATIONS

Machine translation of DE 202011003742 U1 performed on Jul. 24, 2024, Liu et al. (Year: 2011).*

(Continued)

*Primary Examiner* — Brian W Jennison
*Assistant Examiner* — Kevin Guanhua Wen
(74) *Attorney, Agent, or Firm* — Womble Bond Dickinson (US) LLP

(57) ABSTRACT

A silicon heating mat, the mat being formable and deformable and including a matrix made of elastic material, in which at least one cavity is arranged that fully passes through the matrix, the at least one cavity being intended to accommodate a resistive filament connected to a heating cycles management unit. Furthermore, the at least one cavity has an undulating layout, with each resistive filament being able to move inside said at least one cavity, and each resistive filament having a zigzag or spiral shape.

10 Claims, 1 Drawing Sheet

(56) References Cited

FOREIGN PATENT DOCUMENTS

| | | | | | |
|---|---|---|---|---|---|
| DE | 202011003742 | U1 | * | 6/2011 | ............... H05B 3/34 |
| DE | 102017210839 | A1 | * | 12/2018 | ............... H05B 3/34 |
| FR | 1031119 | A | | 6/1953 | |
| KR | 20120000878 | A1 | * | 1/2012 | ............... H05B 3/34 |
| KR | 10-2013-0081452 | A | | 7/2013 | |
| KR | 20130081452 | A1 | * | 7/2013 | ........... H05B 1/0277 |

OTHER PUBLICATIONS

Machine translation of KR 20120000878 A1 performed on Jul. 24, 2024, Park (Year: 2012).*

Machine translation of CN 102912521 A1 performed on Jul. 24, 2024, Jeon (Year: 2013).*

Machine translation of DE 3423999 A1 performed on Jul. 24, 2024, Schuster (Year: 1985).*

Machine translation of KR 20130081452 A1 performed on Jul. 24, 2024, Choi (Year: 2013).*

Machine translation of DE 102017210839 A1 performed on Dec. 23, 2024, Herchet et al. (Year: 2018).*

International Search Report received for PCT Patent Application No. PCT/FR2020/050569, mailed on Jul. 15, 2020, 6 pages (2 pages of English Translation and 4 pages of Original Document).

* cited by examiner

[Fig. 1]
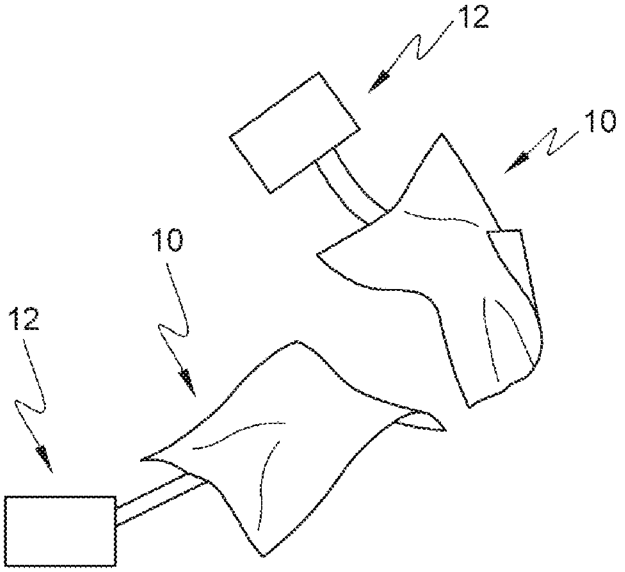
[Fig. 2]
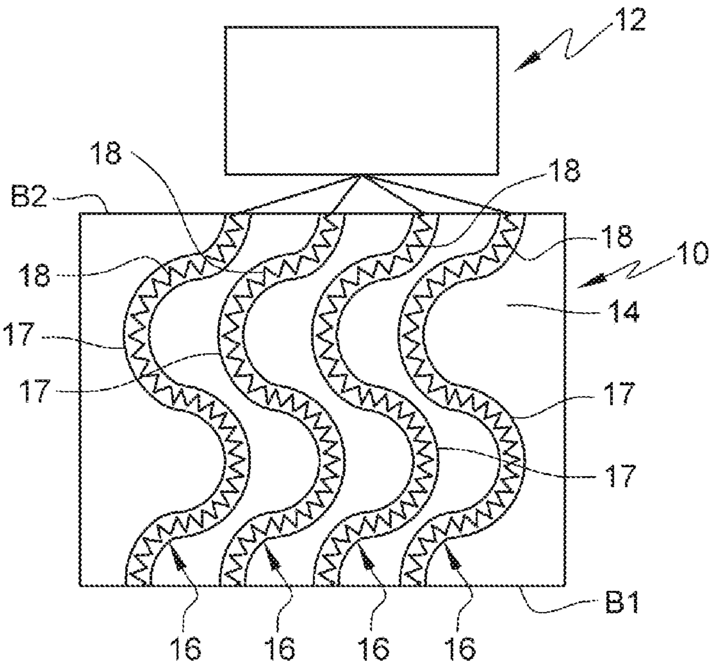

DEFORMABLE AND FORMABLE HEATING MAT

1. FIELD OF THE INVENTION

The present invention relates to the field of heating devices and in particular to deformable and formable heating mats, intended to allow heat to be supplied to mechanical parts, in particular during the production thereof. The present invention also relates to a method of manufacturing such a heating mat.

2. BACKGROUND

The technical background is illustrated by the documents DE-U1-20 2011 003 742, U.S. Pat. No. 5,002,335, US-A1-2011 114 619, FR-A-1 031 119 and KR-A-2013 008 14 52.

Nowadays, in the context of the manufacture of elements of composite materials, it is usual to use heating mats to enable the polymerisation steps. The heating mats are usually controlled by a heating unit which makes it possible to manage the various heating cycles, in particular: the rate of temperature rise, the plateau temperature (generally a maximum of 200° C.), the duration of the plateau and the rate of temperature fall.

In a conventional manner and known per se, these heating mats consist of a matrix made of elastic material (for example silicone) through which heating resistors in the form of resistive filaments circulate, connected by a wire to the management unit.

However, the heating mats of the prior art have two main disadvantages:

- they are not extensible, or in relatively small extent: typically 30% in a preferred direction,
- they are formable to two-dimensional shapes, but not to complex geometries or geometries with too large angles, e.g. right angles or acute angles, making it impossible to make them follow and fit to a corner or ridge.

In the current technique, if a heating mat is used for the manufacture/finishing of a complex part (e.g. 3-dimensional or with ridges) then there is a significant risk that the heating mat will not correctly follow the shape and/or contour of the part in question. The risk of damage to the mat is also high, as if the heating mat is pressurised to be held in position (e.g. by means of a vacuum bag) along the contour of the part to be manufactured/finished, then the resistive filaments may break. These breaks result in the failure of the mat.

3. OBJECTIVE OF THE INVENTION

The present applicant has therefore set himself the objective of presenting a heating mat which allows to ensure the manufacture/finishing of a part made of composite material with a complex shape and/or contour and/or comprising at least one corner and/or ridge without risking damage to said heating mat.

4. DISCLOSURE OF THE INVENTION

This is achieved in accordance with the invention by means of a heating mat comprising a matrix made of elastic material, said matrix having at least one heating element passing therethrough and connected to a power source, characterised in that:

- the mat comprises at least one cavity that fully passes through the matrix, said cavity being intended to accommodate the heating element,
- said at least one cavity has an undulating layout,
- each heating element is capable of movement within said at least one cavity, and
- each heating element has a zigzag or spiral shape.

Thus, this solution achieves the above-mentioned objective. In particular, both the layout of the cavities (allowing them to deform and extend), and the shape of the heating elements (also allowing them to stretch and deform within each cavity without the risk of damage), allow the elastic properties of the heating mat to be brought closer to those of a matrix made of pure elastic material, allowing greater deformations.

The invention also takes into account one or more of the following features, taken alone or in combination:

- each heating element is heat treated,
- each heating element is curved,
- said at least one heating element is a resistive filament
- the mat is elastically deformable through an angle of about 90° without compromising the proper functioning of said at least one resistive filament,
- the heating mat can extend at least twice its length in all directions without compromising the proper functioning of said at least one resistive filament,
- the elastic material is, for example, a silicone,
- the mat comprises a plurality of cavities each accommodating a heating element.

The invention also relates to a method for manufacturing a heating mat made of a matrix made of elastic material comprising the following steps:

- depositing a first matrix layer made of unvulcanised elastic material in a mould,
- depositing, across this first matrix layer made of unvulcanised elastic material, at least one wall protector of an undulated tube,
- inserting a heating element into each protection,
- depositing a second matrix layer made of unvulcanised elastic material,
- vulcanising the assembly so that the two layers of elastic material form a single, continuous matrix.

The method may also comprise one or more of the following steps:

- each heating element is heat treated before insertion into said at least one wall protector of the tube,
- each heating element is curved prior to inserting into said at least one wall protector of the tube,
- said at least one wall protector of the tube is made of Teflon®.

5. BRIEF DESCRIPTION OF THE FIGURES

The invention will be better understood, and other purposes, details, characteristics and advantages thereof will become clearer on reading the following detailed explanatory description of the embodiments of the invention given by way of purely illustrative and non-limiting examples, with reference to the appended schematic drawings in which:

FIG. 1 is a perspective view of a heating mat according to the invention,

FIG. 2 is a schematic cross-sectional view of a heating mat according to the invention.

6. DESCRIPTION OF EMBODIMENTS OF THE INVENTION

FIG. 1 shows a heating mat 10 according to the invention. Generally square in shape, the heating mat 10 typically has dimensions of 10 cm by 10 cm up to 60 by 60 cm. The heating mat 10 may also be rectangular or circular in shape with dimensions of up to 60 cm in side or diameter.

It can be seen that each heating mat 10 is connected to a power source 12, more particularly to a heating cycle management unit 12 having the usual possibilities of management units already present on the market, as described in the introduction. It can be seen from FIG. 1 that the heating mat 10 is flexible and can be bent to various angles. The heating mat 10 can also be stretched.

In FIG. 2, it can be seen that the heating mat 10 according to the invention has an inhomogeneous internal structure. Indeed, it can be seen that the heating mat 10 has a matrix 14 made of an elastic material, for example silicone, in which at least one cavity 16 is arranged that fully passes through the matrix 14. The silicone has, depending on its vulcanisation temperature, certain particular and specific properties.

As can be seen in FIG. 2, each cavity 16 extends from a first edge B1 of the heating mat 10 to an opposite edge B2 of said heating mat. Between the edges B1 and B2, the cavity 16 changes direction several times, so as to present a non-linear, preferably rounded or undulating, layout. It can be seen in FIG. 2 that each cavity 16 has, alternately, four curvatures between the edges B1 and B2.

The layout of each cavity 16 is undulating in a three-dimensional space within the heating mat 10.

Each cavity 16 has a circular cross-section of 3 to 5 mm in diameter so as to form a kind of tube. It has a wall 17 made of Teflon® (polytetrafluoroethylene—PTFE) or of any other material which prevents the two silicone sheets from sticking together, such as high-temperature polypropylene. It also has an undulating layout and is separated from its two neighbouring cavities 16 by a minimum 3 mm matrix layer 14. Each cavity 16 may have a unique layout. Each cavity 16 is large enough to accommodate a heating element 18. In the case illustrated in FIG. 2, this is a resistive filament 18. Each cavity 16 is thus sufficiently wide to allow the resistive filament 18 accommodated therein to be moved without risk of damage within said cavity 16. The resistive filaments 18 are connected to the management unit 12. The management unit 12 typically sends temperature set points in the form of electrical signals through the resistive filaments 18.

It can also be seen that each resistive filament 18 is curved: it has a zigzag or spiral shape (like a corkscrew). Each resistive filament 18 can thus move and stretch within the cavity 16, allowing for greater adaptability and positioning when the heating mat 10 is stretched and/or bent.

Each resistive filament 18 has a non-straight path within the cavity (16).

This reduces the risk of breaking any of the resistive filaments 18 compared to a conventional heating mat structure in which the filaments are inserted straight and linear within the silicone matrix 14.

The resistive filaments 18 may, for example, be composed of Nickel (Ni) and Chromium (Cr).

According to the present invention, each resistive filament 18 is, also heat treated after bending to further reduce their risk of breakage. The heat treatment typically consists of heating to 1200° C. for 5 to 6 hours.

This treatment of the resistive filaments 18 brings the deformation and elasticity characteristics of the heating mat 10 closer to those of a pure silicone matrix 14. Indeed, following this treatment and this arrangement of the resistive filaments 18 within the matrix 14 of the heating mat 10, the heating mat 10 is elastically deformable through an angle of 90° without compromising the proper functioning of the resistive filaments 18. Similarly, the heating mat 10 according to the invention can extend at least twice its length in all directions without compromising the proper functioning of the resistive filaments 18. By "proper functioning of the filaments 18" is meant the absence of breakage or damage that would no longer allow the temperature set points from the management unit 12 to be conveyed without difficulty.

The heating mat 10 is thus formable to any type of part/contour and deformable to a sufficient extent to allow its use in relation to parts with complex shapes/contours, such as turbomachine parts (e.g. flanges, casings, blades, etc.).

The heating mat 10 is manufactured in a process that comprises five steps:

- depositing a first matrix layer 14 of unvulcanised silicone in a mould,
- depositing, across this first layer of unvulcanised silicone 14, of a protection made of Teflon® or of any other material allowing the two silicone sheets not to adhere to each other, for example high temperature polypropylene. The protection made of Teflon® forms the wall 17 of an undulated tube,
- inserting a curved and heat-treated resistive filament 18 into each protection made of Teflon®,
- depositing a second layer of unvulcanised silicone matrix 14,
- vulcanising the assembly 10 so that the two silicone layers form a single, continuous matrix 14.

In this way, at the end of the method, the resistive filaments 18 are enclosed in the cavities 16, protected in all directions by the walls 17 made of Teflon® and the layers of the silicone matrix 14, which now form a single, continuous heating mat 10.

Vulcanisation means a heat treatment above 200° C. over several tens of minutes. This step is adapted according to the types of silicone used to create the matrix 14.

Under these conditions, the heating mat according to the invention 10 is more flexible and extensible and it is, therefore, easier to apply it to complex shapes/contours including, in particular, ridges. The resistive filaments 18 are no longer the fuses of the system: the heating mat 10 can be extended in all three dimensions and within the elastic limits of the silicone. The possibilities of use are thus greatly extended and all methods for processing a material requiring heat input can benefit from this technical improvement. Even if the part is geometrically complex, a formable and deformable heating mat 10 makes it possible to dispense with an autoclave or oven in certain cases: composite lamination, gluing, preheating before welding or brazing, expansion of a part before clamping or crimping.

The invention claimed is:

1. A heating mat comprising a matrix made of elastic material, said matrix having at least one heating element passing therethrough and connected to a power source, wherein the mat comprises at least one cavity that fully passes through the matrix, said cavity being intended to accommodate the heating element and having an undulating layout, and each heating element is capable of free movement within said at least one cavity, and has a zigzag or spiral shape, which allows said mat to be elastically deformable.

2. The heating mat according to claim 1, wherein each heating element is heat treated.

3. The heating mat according to claim 1, wherein each heating element is curved.

4. The heating mat according to claim 1, wherein said at least one heating element is a resistive filament.

5. The heating mat according to claim 1, wherein said mat is elastically deformable through an angle of about 90° without compromising the proper functioning of said at least one heating element.

6. The heating mat according to claim 1, wherein the heating mat can extend by at least twice its length in all directions without compromising the proper functioning of said at least one heating element.

7. A method for manufacturing a heating mat made of a matrix made of elastic material according to claim 1, wherein said method comprises the following steps:

depositing a first matrix layer made of unvulcanised elastic material in a mould, depositing, across this first matrix layer made of unvulcanised elastic material, at least one wall protector of an undulated tube, inserting a heating element into each protection, depositing a second matrix layer made of unvulcanised elastic material, vulcanising the assembly so that the first and second layers form a single continuous matrix, wherein the heating element is capable of free movement within said at least one cavity, and has a zigzag or spiral shape, which allows said mat to be elastically deformable.

8. The method for manufacturing according to claim 7, wherein each heating element is heat treated before insertion into said at least one wall protector of the tube.

9. The method for manufacturing according to claim 7, wherein each heating element is curved prior to inserting into said at least one wall protector of the tube.

10. The method for manufacturing according to claim 7, wherein said at least one wall protector of the tube is made of Teflon®.

* * * * *